Patented May 5, 1953

2,637,732

UNITED STATES PATENT OFFICE 2,637,732

PROCESS FOR THE MANUFACTURE OF PYRAZOLONES

Max Schmid, Riehen, and Eduard Moser, Basel, Switzerland, assignors to Ciba Limited, Basel, Switzerland, a Swiss firm No Drawing. Application October 19, 1950, Serial No. 191,076. In Switzerland November 8, 1949

8 Claims. (Cl. 260—310)

It is known that pyrazolones can be obtained by condensing β-keto-carboxylic acid amides (acyl-acetic acid amides) with hydrazines. However, this process has found hardly any technical application, as the corresponding pyrazolones are generally made by condensing the β-keto-carboxylic acid esters with hydrazine or substitution products thereof.

The present invention is based on the observation that a group of pyrazolones, which have been obtainable hitherto only with difficulty or in poor yields or by complicated methods, namely pyrazolones which still contain in the molecule a free amino group, can be made in an especially simple manner by condensing an aryl-hydrazine, which contains a free amino group, with acetoacetic acid amide.

The aryl-hydrazines containing a free amino group used as starting materials in the present process may contain, for example, the hydrazine group (—NH—NH$_2$) and also a free amino group in one and the same benzene nucleus. The aryl residue of the aryl-hydrazine may contain several rings, for example, benzene rings fused or linked together. As examples of suitable starting materials there may be mentioned 4-amino-4'-hydrazine-stilbene-2:2'-disulfonic acid and 4-amino-diphenyl-4'-hydrazine and especially meta-amino-phenyl-hydrazine.

The acetoacetic acid amide also required for the reaction can be obtained in a simple manner by reacting diketene with ammonia. The above mentioned hydrazine compounds containing an amino group are also obtainable by known methods (see for example Beilstein's Handbuch der Organischen Chemie vol. XV, page 651 and U. S. Patents 2,195,785 and 2,195,786).

The condensation of the hydrazine compounds containing an amino group with acetoacetic acid amide can be carried out as desired in a medium containing an organic solvent, but in most cases in a simple manner in an aqueous medium, which may, if desired, also contain an organic solvent miscible with water, such as an alcohol of low molecular weight. The reaction takes place surprisingly rapidly in most cases at a low temperature, for example, at room temperature. In many cases it is of advantage to conduct the condensation in an approximately neutral to weakly acid medium, for example an acetic acid medium. Depending on the starting material used, for example, on whether it is a mono- or dihydrochloride of a hydrazine containing an amino group, it may be of advantage to adjust the pH of the solution to a favorable value by the addition of an alkali or an acid or buffering compound such as sodium acetate.

The resulting pyrazolones, which still contain a free amino group, are in part known and in part new. They are valuable intermediate products especially for the manufacture of azo-dyestuffs.

It is surprising that the present process proceeds smoothly, especially as corresponding reactions with β-keto-carboxylic acid esters are much more difficult to carry out or lead to large quantities of undesired, for example, resinous, by-products.

The following examples illustrate the invention, the parts and percentages being by weight unless otherwise stated and the relationship of parts by weight to parts by volume being the same as that of the kilogram to the liter.

Example 1

19.6 parts of the dihydrochloride of meta-amino-phenyl-hydrazine are dissolved in 100 parts of water at room temperature and 28 parts of crystalline sodium acetate are added. 100 parts by volume of an aqueous solution of 10 per cent. strength of acetoacetic acid amide (which may be prepared for example, by neutralizing an aqueous solution of ammonia with diketene while cooling with ice-water) are poured in while stirring. The condensation to meta-amino-phenyl-3-methyl-5-pyrazolone of the formula

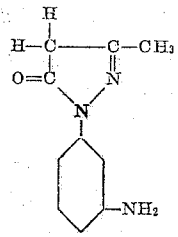

takes place rapidly. The whole is further stirred for 2–3 hours and the pyrazolone is precipitated by the addition of sodium chloride. It is a yellow-brown powder which, when titrated with diazo-benzene consumes, per mol, one mol of the reagent and when titrated with nitrous acid consumes, per mol, 2 mols of the reagent.

Example 2

45.8 parts of the dihydrochloride of 4-amino-4'-hydrazine-stilbene-2:2'-disulfonic acid are dissolved in 200 parts of water with 46 parts of a sodium hydroxide solution of 30 per cent. strength at room temperature and 100 parts by volume of an aqueous solution of 10 per cent. strength of acetoacetic acid amide are added. 10 parts of glacial acetic acid are poured into the clear solution and the whole is stirred for 2-3 hours until hydrazine can no longer be detected. Then sodium carbonate (about 20 parts) is added until the solution shows alkaline reaction to Brilliant Yellow, and the solution is heated to 50° C. 4 - amino - stilbene - 2:2' - disulfonic acid - 4' - (3-methyl-5-pyrazolone) of the formula

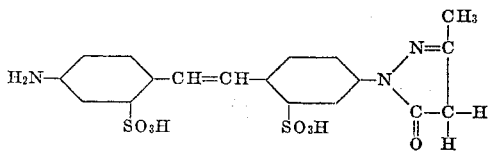

is precipitated by adding about 50 parts of hydrochloric acid of 30 per cent. strength to produce a reaction weakly acid to Congo, and the product is separated by filtering with suction. When dried it is a yellow-brown powder which when titrated with diazo-benzene, consumes, per mol, one mol of the reagent and when titrated with nitrous acid consumes per mol, 2 mols of the reagent.

Example 3

27.2 parts of dihydrochloride of 4-amino-diphenyl-4'-hydrazine are stirred in 250 parts of alcohol of about 50 per cent. strength at room temperature, and 27 parts by volume of sodium hydroxide solution of 30 per cent. strength are added. 8 parts of glacial acetic acid and then 10.1 parts of acetoacetic acid amide (which is obtained, for example, by evaporating the aqueous solution in vacuo at 50-60° C.) are added to the thinly liquid suspension. The condensation to form the pyrazolone takes place after stirring for a short time. About 160 parts of sodium hydroxide solution of 5 per cent strength are then poured in, and the solution which is weakly alkaline to phenolphthalein is filtered to remove impurities, and 4-amino-diphenyl-4'-(3-methyl-5-pyrazolone) of the formula

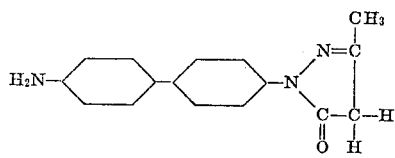

is precipitated by adding sufficient hydrochloric acid to produce a weakly acid reaction to Congo. The product is yellow-brown, and when titrated with diazo-benzene consumes, per mol, one mol of the reagent, and when titrated with nitrous acid consumes, per mol, 2 mols of the reagent.

While the invention has been illustrated by means of examples of amino-aryl-hydrazines of the benzene, diphenyl and stilbene series because the resulting pyrazolones are especially valuable products, it is to be understood that the present process can be used with other amino-aryl-hydrazines, for example, of the naphthalene series as well, provided always that both the hydrazine group and the amino group are directly bound to an aromatic radical.

What we claim is:

1. A process for the manufacture of a pyrazolone containing a free amino group, which comprises condensing in an aqueous medium of about neutral to weakly acid reaction, one molecular proportion of an aryl-hydrazine corresponding to the formula

R—NH—NH$_2$ wherein R stands for an aryl radical containing an aromatically bound free amino group with one molecular proportion of acetoacetic acid amide, and recovering the amino-aryl pyrazolone thus formed.

2. A process for the manufacture of a pyrazolone containing a free amino group, which comprises condensing in an aqueous medium containing a substantial proportion of an alcohol of low molecular weight for promoting the solubility of the reactants, the said medium being of about neutral to weakly acid reaction, one molecular proportion of an aryl-hydrazine corresponding to the formula

R—NH—NH$_2$ wherein R stands for an aryl radical containing an aromatically bound free amino group with one molecular proportion of acetoacetic acid amide, and recovering the amino-aryl pyrazolone thus formed.

3. A process for the manufacture of a pyrazolone containing a free amino group, which comprises condensing one molecular proportion of a phenyl-hydrazine of the formula phenyl—NH—NH$_2$ containing a free amino group as a substituent in the phenyl radical with one molecular proportion of acetoacetic acid amide, and recovering the amino-phenyl pyrazolone thus formed.

4. A process for the manufacture of a pyrazolone containing a free amino group, which comprises condensing one molecular proportion of a diphenyl-hydrazine of the formula diphenyl—NH—NH$_2$ containing a free amino group as a substituent in the diphenyl radical with one molecular proportion of acetoacetic acid amide, and recovering the amino-diphenyl pyrazolone thus formed.

5. A process for the manufacture of a pyrazolone containing a free amino group, which comprises condensing one molecular proportion of a stilbene-hydrazine of the formula stilbene—NH—NH$_2$ containing a free amino group as a substituent in the stilbene radical with one molecular proportion of acetoacetic acid amide, and recovering the amino-stilbene pyrazolone thus formed.

6. A process for the manufacture of meta-amino - phenyl - 3 - methyl - 5 - pyrazolone, which comprises condensing in an aqueous medium of about neutral to weakly acid reaction one molecular proportion of meta-amino-phenyl-hydrazine with one molecular proportion of acetoacetic acid amide, and recovering the product thus formed.

7. A proces for the manufacture of 4-amino-stilbene - 2:2' - disulfonic acid - 4' - (3 - methyl-5-pyrazolone), which comprises condensing in an aqueous medium of about neutral to weakly acid reaction one molecular proportion of 4-amino - 4' - hydrazino - stilbene - 2:2' - disulfonic acid with one molecular proportion of acetoacetic acid amide, and recovering the product thus formed.

8. A process for the manufacture of 4-amino-diphenyl - 4' - (3 - methyl - 5 - pyrazolone), which comprises condensing in an aqueous medium of about neutral to weakly acid reaction one molecular proportion of 4-amino-diphenyl-4'-hydrazine with one molecular proportion of acetoacetic acid amide, and recovering the product thus formed.

MAX SCHMID.
EDUARD MOSER.

References Cited in the file of this patent

UNITED STATES PATENTS

| Number | Name | Date |
|---|---|---|
| 2,017,671 | Ostromislensky | Oct. 15, 1935 |
| 2,017,815 | Johnston | Oct. 15, 1935 |
| 2,227,654 | Lecher et al. | Jan. 7, 1941 |

FOREIGN PATENTS

| Number | Country | Date |
|---|---|---|
| 41,936 | Germany | Jan. 31, 1888 |

OTHER REFERENCES

Bull. Soc. Chim. (4)—1, p. 1071.
Beilstein, Organische Chemie, vol. 15, p. 344.